United States Patent [19]

Fujimoto et al.

[11] 3,849,762

[45] Nov. 19, 1974

[54] DIGITAL INFORMATION PROCESSING APPARATUS FOR PATTERN RECOGNITION

[75] Inventors: Yoshiji Fujimoto, Hachioji; Toshihiro Hananoi, Matsudo; Michio Yasuda, Koganei; Hiroshi Makihara, Kokubunji; Masaru Kuramizu, Hachioji; Minoru Ota; Hiroshi Kokido, both of Odawara; Shozo Kadota, Kokubunji, all of Japan

[73] Assignee: Hitachi, Ltd., Tokyo, Japan

[22] Filed: Mar. 7, 1973

[21] Appl. No.: 338,888

[30] Foreign Application Priority Data

Mar. 8, 1972 Japan .............................. 47-23092

[52] U.S. Cl. ...................... 340/146.3 Q, 340/146.2

[51] Int. Cl. ........................................... G06k 9/00

[58] Field of Search .......... 340/146.3 Q, 146.3 MA, 340/146.3 S, 146.3 R, 172.5, 146.2

[56] References Cited

UNITED STATES PATENTS

| | | | |
|---|---|---|---|
| 3,295,103 | 12/1966 | Driese et al. | 340/146.3 S |
| 3,492,646 | 1/1970 | Bene et al. | 340/146.3 Q |

*Primary Examiner*—Gareth D. Shaw
*Assistant Examiner*—Leo H. Boudreau
*Attorney, Agent, or Firm*—Craig & Antonelli

[57] ABSTRACT

A digital information processing apparatus for pattern recognition comprising a memory unit for storing information consisting of a plurality of words representing an unknown character and a plurality of pieces of information representing a plurality of standard characters each of which consists of the same number of words as the information representing the unknown character and which are stored in series so that the words of the corresponding orders in the respective information are sequentially stored, means for reading out of the memory unit the information representing the unknown character every each word and each piece of information representing one of the standard characters every each word, means for comparing these information thus read by means of each bit of the word and detecting the number in which the compared bits agree with each other, and means for adding a correlation constant predetermined in accordance with the standard character under the comparison by the number of agreements, so that similarity of the unknown character with each standard character is determined by means of a single instruction.

6 Claims, 7 Drawing Figures

DIGITAL INFORMATION PROCESSING APPARATUS FOR PATTERN RECOGNITION

FIELD OF THE INVENTION

This invention relates to a digital information processing apparatus used in an optical character reader for reading printed characters, or more in particular to an apparatus for determining the similarity between an unknown character and each of a plurality of standard characters in printed character recognition by pattern matching.

DESCRIPTION OF THE PRIOR ART

Figure 1:
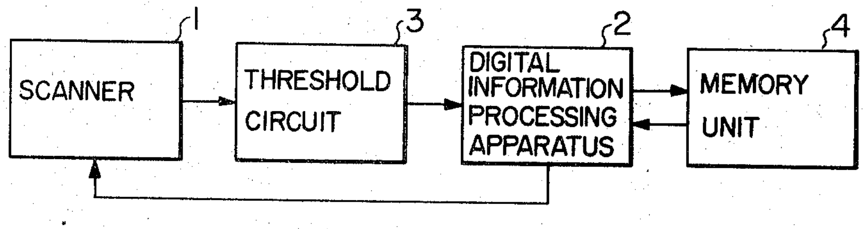
FIG. 1 is a block diagram showing the arrangement of a conventional optical character reader.

In character recognition by pattern matching, the correlation between the pattern of an unknown character involved and each of all standard characters is determined in the first place. The correlation between the pattern $Px\ (i, j)$ of an unknown character X and the pattern $P_A\ (i, j)$ of a standard character A is expressed as $$S_{XA} = \sum_i \sum_j P_X(i, j) \cdot P_A(i, j)$$

where $(i, j)$ is a co-ordinate on the pattern. In this connection, if $P_X(i, j) = 1$, the co-ordinate shows a solid portion of a printed unknown character $X$. On the other hand, if $P_X\ (i, j) = 0$, the co-ordinate $(i, j)$ indicates a blank portion other than the solid portions of the unknown character X. This is true also for the co-ordinate $P_A\ (i, j)$ of the standard character $A$.

The correlation value $S_{XA}$ between the pattern of the unknown character $X$ and the pattern of the standard character A is multiplied by the constant $K_A$ determined by the standard character A thereby to obtain the similarity $S'_{XA}$ between the unknown character X and the standard character A. That is to say, $S'_{XA} = S_{XA} \times K_A$. In this way, the similarities between the unknown character $X$ and all standard characters are determined.

Of those standard characters, the one which provides the greatest similarity is recognized as identical with the unknown character X. In this case, it is necessary that the standard character which provides the greatest similarity is not more than one and that the difference between the greatest similarity and the next greatest similarity is not less than a predetermined level. If these conditions are not met, the unknown character X is incapable of being recognized.

The recognition logic section of the conventional optical character readers which operate in the above-mentioned manner comprises in many cases a digital logic circuit or a hybrid circuit including an analog circuit and a digital logic circuit. Such a recognition logic section may be constructed in a simple manner at low cost as far as characters to be recognized involve a relatively small number of types of letters such as printed numerals of a single style. When characters to be recognized involve a relatively large number of types of letters such as alphanumeric characters or other numerals which consist of a large number of styles, however, the manufacture and maintenance of the recognition logic section requires complicated procedures to be followed, resulting in a high production cost. Further in such a conventional arrangement, when the styles of the characters to be read are changed, corresponding circuits must be replaced by appropriate ones which requires much time and labor.

A suggested solution to obviate the above-mentioned disadvantages is to use an ordinary digital information processing apparatus. If so, the types of letters to be recognized are easily changed by replacing the data and program stored in a memory unit. It is also possible to increase the number of types of letters to be read by increasing the capacity of the memory unit and data on standard characters.

Figure 2:
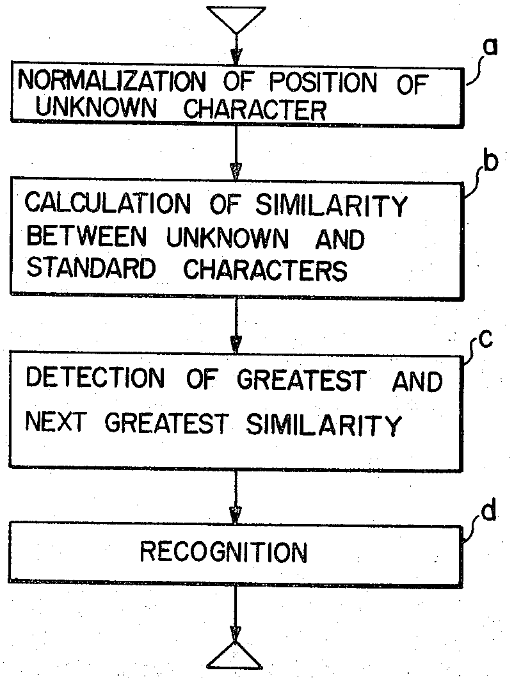
FIG. 2 is a flow chart showing the general principle of character recognition by pattern matching.

An arrangement of the conventional optical character reader using a digital information processing apparatus as a recognition logic section is shown in FIG. 1. In the figure, the reference numeral 1 shows a scanner for scanning object characters by means of a photoelectric converting unit upon the instructions of the digital information processing apparatus 2. An electrical analog signal obtained by the scanning is delivered to the threshold circuit 3 where it is converted into an easily recognizable digital signal, which is then applied to the digital information processing apparatus 2 to be written in the memory unit 4. After the digital signal representing one character is written in the memory unit 4, recognition by pattern matching is effected according to the routines *a*, *b*, *c* and *d* illustrated in FIG. 2. The program already written in the memory unit 4 is read out by the digital information processing apparatus 2 to execute the instructions. In FIG. 2, the symbol "*a*" shows a command to normalize the position of an unknown character, the symbol "*b*" a command to calculate the similarity between the unknown character and the standard character, the symbol "*c*" a command to detect the greatest similarity and the next greatest similarity and the symbol "*d*" a command to determine or identify the unknown character.

In the above-described ordinary digital information processing apparatus, character recognition by pattern matching, especially determination of the correlation value and similarity requires much time. For this reason, when an optical character reader is employed for character recognition by pattern matching, the speed with which the characters are read become inevitably considerably low.

SUMMARY OF THE INVENTION

Accordingly, it is an object of the present invention to provide an optical character reader or more in particular a logic control unit which is capable of determining at a high speed the similarity between an unknown character and each of standard characters.

Another object of the invention is to provide a simple optical character reader at a relatively low cost which is capable of recognition of alpha-numeric characters, possibly with different printing types.

In order to achieve the above-mentioned objects, the optical character reader according to the invention is provided with a logic control unit which is capable of determining the similarity between an unknown character and standard character in the number of M through a single command. In other words, the present invention is characterized by an improved logic control unit for determining the similarity between an unknown character and standard characters as illustrated in the routine *b* of FIG. 2.

DESCRIPTION OF THE PREFERRED EMBODIMENT

Figure 3:
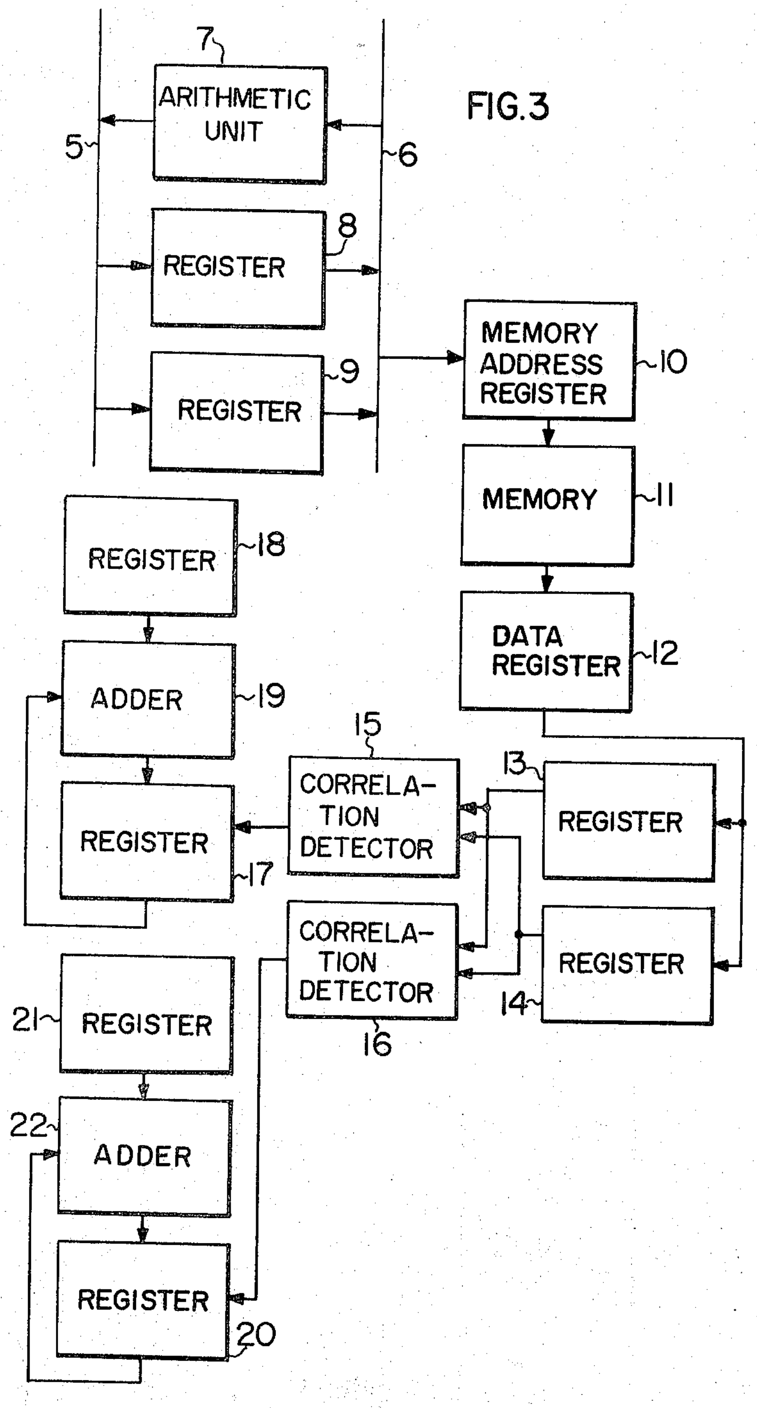
FIG. 3 is a block diagram showing a flow of data as processed in the digital information processing apparatus according to an embodiment of the present invention.

The block diagram of FIG. 3 shows the flow of data along which instructions or commands are executed to determine the similarity according to the invention. An arithmetic unit 7 and registers 8 and 9 are inserted between an input bus 5 and an output bus 6, which is connected through a memory address register 10, through a memory unit 11 to a data register 12. The registers 8 and 9 are provided for the purpose of storing the addresses of the unknown and standard characters stored in the memory unit 11, and to these registers 8 and 9 are delivered through the input bus the data processed by the arithmetic unit 7. In common practice, these sections are used for general arithmetic operations, but in the present invention it is also used to update the addresses of unknown and standard characters in determining the similarity therebetween.

The data of an address designated by memory address register 10 is read out of the memory unit 11 and set in the data register 12. Although it is common practice to use this routine for the execution of instructions and the reading out of and writing in data, it is used in the invention also to read out the pattern of an unknown character or standard character in determining an similarity therebetween.

The data read out by the data register 12 is delivered to a register 13 or 14, which in response to parallel data from the data register 12 delivers as an output a series of bits to a correlation detector 15 or 16. The correlation detector 15, upon detection of an agreement every one bit between the outputs of the registers 13 and 14, applies a clock pulse to a register 17, whereby the output of a register 18 in which the correlation constant of the first standard character is stored is added with the output of the register 17 by an adder 19 and then the result of the addition is set in the register 17. In like manner, when a correlation is detected by the correlation detector 16, a clock pulse is applied to a register 20, so that the output of a register 21 containing the correlation constant of the second standard character is added with the output of the register 20 by an adder 22, and then the results of the addition is set in the register 20. In FIG. 3, only the data flow is shown without the control unit.

Referring to the logic diagram of FIG. **4*a*, the reference numerals 18*a* and 18*b* show flip-flops constituting the register 18 in FIG. 3 for storing the correlation constant of the first standard character, the numerals 17*a* and 17*b* parts of the register for storing the similarity determined and the numeral 19 the adder 19 in FIG. 3. The flip-flops 18*a* and 18*b* represent two bits of the lowest and the next lowest orders of the information stored in the register 18** respectively.

It is now assumed for the purpose of FIG. **4*a* that the correlation constant of the first standard character is set in the register 18 in advance upon another instruction and that the delay flip-flops 17*a* and 17*b* represent two bits of the lowest orders stored in the register 17 of FIG. 3.**

Figure 4A:
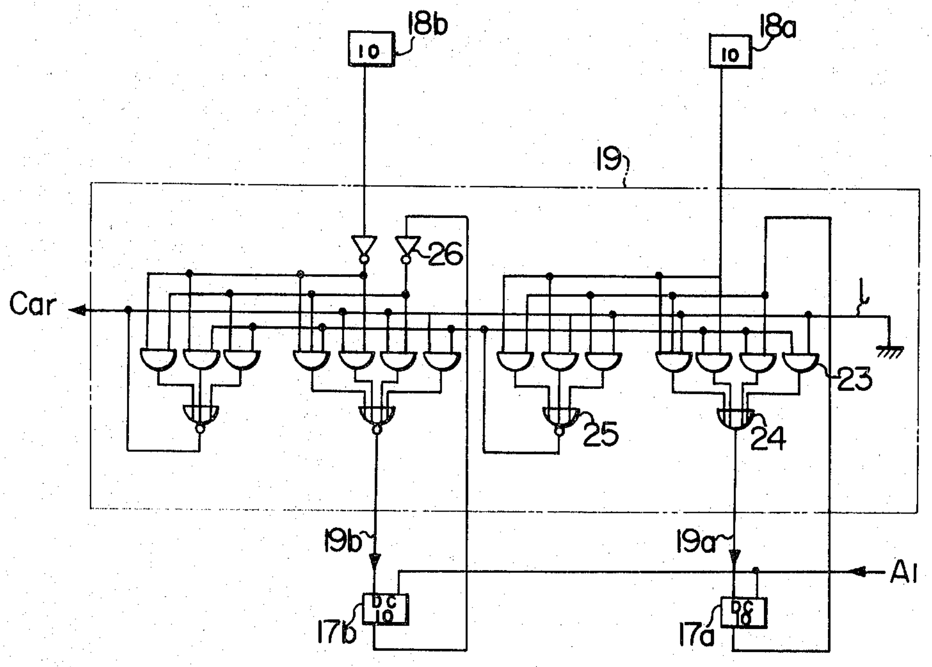
FIG. 4*a*, 4*b* and 4*c* are logic diagrams showing in detail the sections of the preceding embodiment of FIG. 3 in which the similarity is determined.

The flip-flops **17*a* and 18*a*, 17*b* and 18*b* are connected to the adder 19 which is an ordinary adder comprising AND gates 23, an OR gate 24, NAND gates 25 and inverters 26. In response to the inputs applied to the flip-flops 18*a*, 18*b*, 17*a* and 17*b*, the adder 19 delivers its outputs 19*a* and 19*b* to the input terminals D of the delay flip-flops 17*a* and 17*b* respectively. For convenience of illustration, the circuit of FIG. 4*a*** is concerned with only two bits of the lowest orders, the other higher orders of bits being omitted.

The number of bits stored in the register 18 shown in FIG. 3 is determined by the maximum number of digits of the correlation constant, while the number of bits stored in the register 17 depends upon the number of digits of the correlation constant and the maximum correlation value. The register 21 contain the correlation constant of the second standard character, the adder 22 and the register 20 to contain the similarity have exactly the same construction as the register 18 to contain the correlation constant of the first standard character, the adder 19 and the register 17, respectively. The symbol Car in FIG. **4*a*** shows a signal to carry forward to the next significant digit. The line *l* for carrying forward to the lowest bit is grounded and therefore the gate connected to the line *l* is not required actually, even though the logic circuit of FIG. **4*a*** which is an integrated circuit includes such a gate.

The logic diagram of FIG. **4*b* shows in detail the data register 12, registers 13 and 14 and the correlation detectors 15 and 16, flip-flops 12*a* to 12*d* making up the data register 12. In spite of the fact that the memory unit 11** in the figure is concerned with 4 bits per word, it is apparent that the number of bits may be increased at will.

For convenience of illustration, the logic of the flip-flops **12*a* to 12*d* in which the data read out of the memory until 11 is set will not be shown in the drawing. Flip-flops 13*a* to 13*d* and 14*a* to 14*d* make up the registers 13 and 14 respectively, which contain the same number of bits as the register 12** respectively.

When the mode signal D for switching the input to the flip-flops **13*a* to 13*d* is a 1 signal, the data from the flip-flops 12*a* to 12*d* are set in the flip-flops 13*a* to 13*d* in response to a clock signal applied thereto. When the mode signal D is a 0 signal, on the other hand, the data is shifted leftward upon receipt of a clock signal, so that the data which had been stored in the flip-flops 13*c*, 13*b*, 13*a* and 13*d* before the application of the clock signal are set in the flip-flops 13*d*, 13*c*, 13*b* and 13*a* respectively. This holds true also for the flip-flops 14*a* to 14*d*, which when the mode signal D is a 1 signal, receive the data from the flip-flops 12*a* to 12*d*** upon receipt of a clock signal.

If a clock signal is applied to the flip-flops **14*d*, 14*c* and 14*b* when the mode signal D is a 0 signal, the data which had been stored in the flip-flops 14*c*, 14*b* and 14*a* before the application of the clock signal to the flip-flops 14*d*, 14*c* and 14*b* are set therein respectively. The clock input signals to the flip-flops 13*a* to 13*d* are generated in AND circuits 28, 29 and 30 and an OR circuit 31**. In other words, when the control signal $R_0$ is a 1 signal, the timing pulses $C_2$ $C_3$ make up the clock signal, while on the other hand when the control signal $R_2$ is a 1 signal, the timing pulse $C_2$ constitutes the clock input signal.

The clock input signals to the flip-flops 14*a* to 14*d* are generated in the AND circuits 28, 32, 30 and 33 and the OR gate 34. In other words, when the control signal $R_1$ or $R_0$ is a 1 signal, the timing pulse $C_3$ or $C_2$ makes up the clock input signal respectively, while on the other hand when the control signal $R_2$ is a 1 signal, the timing pulses $C_2$ and $C_3$ constitute the clock input signal. The AND gate 15*a* constitutes the correlation detector 15, which delivers an output $A_1$ in response to the timing pulse $C_1$ when both the control signals $R_2$ and DR are a 1 signal while the flip-flops 13*d* and 14*d* are in the state of 1.

Further, the AND gate 16*a* makes up the correlation detector 16, which produces an output $A_2$ in response to the timing pulses $C_1$ when the control signals $R_0$ and DR are both a 1 signal while the flip-flops 13d and 14d are both in the state of 1 .

Figure 4B:
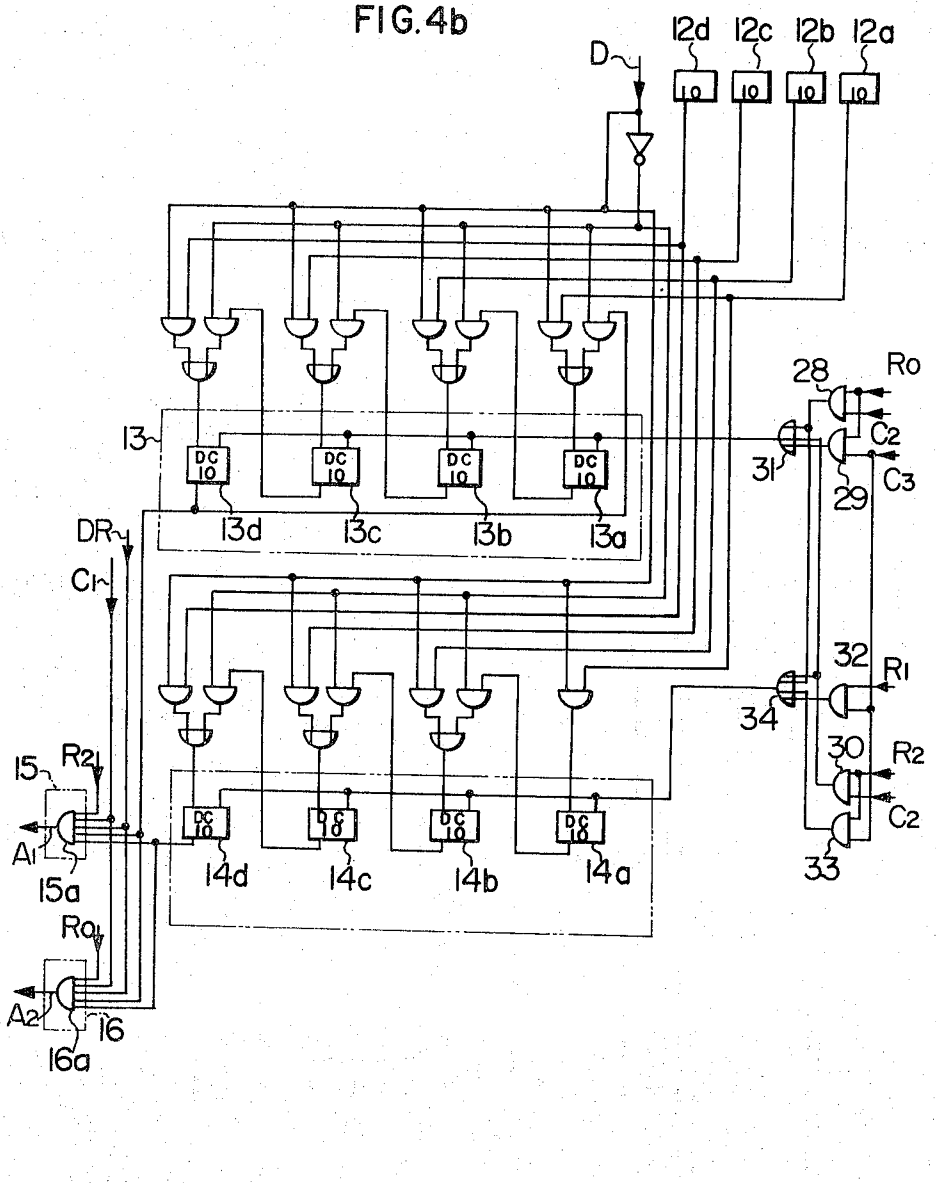
Figure 4C:
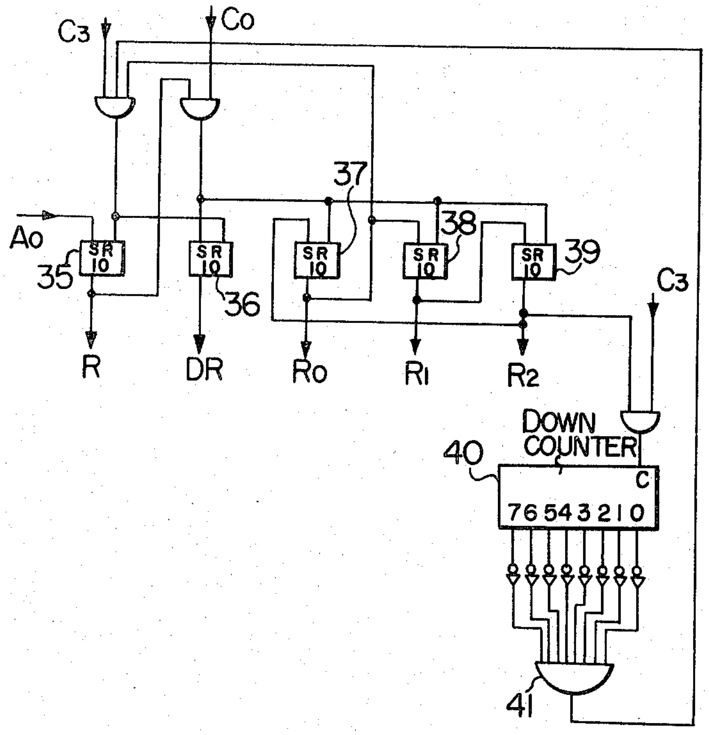

The logic of the essential parts of the control means is shown in FIG. 4*c*. The reference numeral 35 shows a flip-flop provided for the purpose of indicating that the calculation for determining the similarity is under way upon an instruction. Prior to the starting of the calculation of the similarity upon an instruction, the flip-flop 35 is set by the set signal $A_0$ from the decoding section while it is reset on completion of the calculation. The decoding section referred to above is an ordinary one used for general processing work and is not shown in the drawing. The 1 output delivered from the flip-flop 35 constitutes the control signal R.

A flip-flop 36 is set one cycle later than the flip-flop 35 thereby indicating that the second and subsequent cycles of calculation of the similarity are under way. The 1 output of the flip-flop 36 constitutes the control signal DR. The flip-flop 36 is also reset on completion of the calculating operation. (Explanation will be made later of the cycle).

A flip-flop 37 is provided for indicating that the cycle is under way to read out an unknown pattern from the memory unit 11 of FIG. 3, and the 1 output of the flip-flop 37 makes up the control signal $R_0$. Flip-flops 38 and 39 indicate that the cycles are under way to read the first and second patterns from the memory unit 11 respectively, and the 1 outputs of the flip-flops 38 and 39 make up the control signals $R_1$ and $R_2$ respectively. The flip-flops 37, 38 and 39 make up a ring counter, in which application of a clock signal causes the flip-flops 37, 38 and 39 to be put into the states of the flip-flops 37, 38 and 39 respectively prior to the application of the clock input signal. These operations, however, are based on the assumption that 1, 0 and 0 signals are set in the flip-flops 37, 38 and 39 respectively at the time of starting the calculation of the similarity.

A counter 40 is provided for the purpose of indicating the completion of the calculation of the similarity and in this counter 40 is set at the beginning of calculation a predetermined numerical value by setting means which is not shown in the drawing. During the calculating operation, a clock pulse is applied to the counter 40 in response to the timing pulse $C_3$ while the control signal $R_2$ is in the state of 1, whereby the counter 40 begins to operate. The fact that as shown in the drawing the counter 40 is a binary one consisting of eight bits is not an essential factor of the invention, but it is apparent that it may be enlarged to a larger number of bits as desired.

An AND gate 41 receives the outputs of the counter 40 through the inverter and produces as output a 1 signal when the counter 40 indicates the value of zero, thereby to indicate that it is ready for calculating operation.

Figure 5:
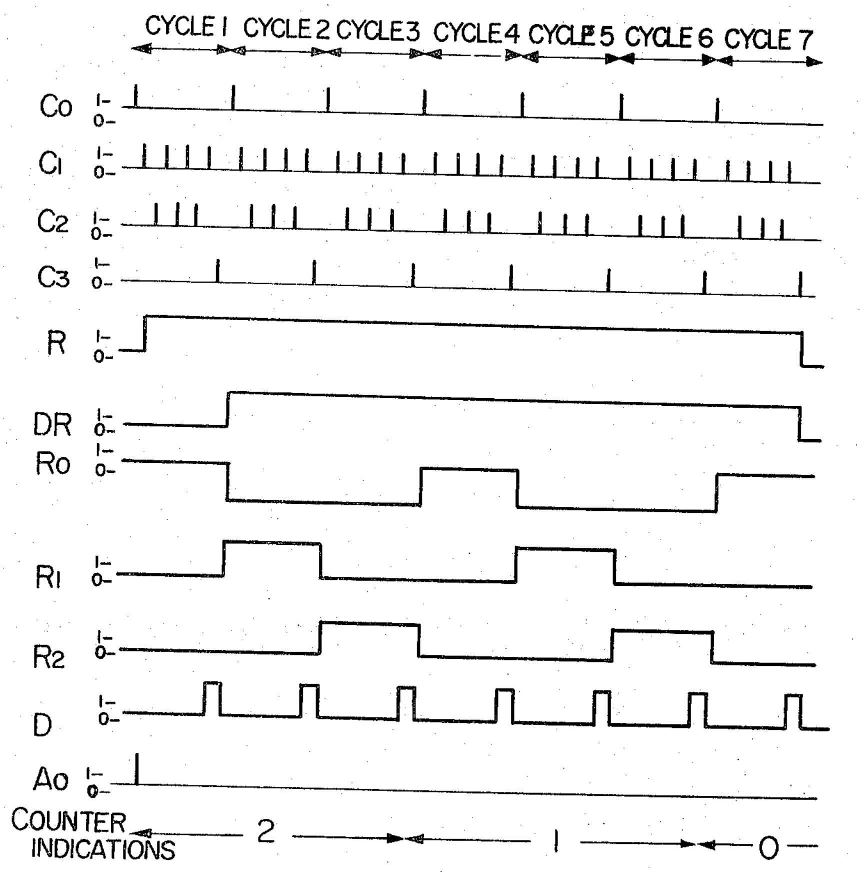
FIG. 5 is a time chart for explaining the operation of the above-mentioned sections of the embodiment of FIG. 3.

A time chart showing the processes through which the calculation of the similarity is conducted is illustrated in FIG. 5. The basic cycle of the operation of similarity calculation is subdivided by the use of timing pulses to perform the calculating operation for each cycle. The operation for each cycle will be now explained with reference to FIGS. 4*a* to 4*c* and FIG. 5.

First, the timing pulse $C_0$ is delivered, followed by the delivery of the timing pulse $C_1$ and then the timing pulse $C_2$. Subsequently, the timing pulses $C_1$ and $C_2$ are alternately delivered, and finally with the delivery of the timing pulse $C_3$ a cycle is completed. The number of timing pulses $C_1$ generated in one cycle is the same as the number of the bits stored in the data register 12, that is, the number of the bits making up one word stored in the memory unit 11, while the number of timing pulses $C_2$ generated during the same period is less than that by one. The mode signal D is changed into the state of 1 after generation of the last timing pulse $C_1$ within a cycle, while on the other hand it is put into the state of 0 after the next timing pulse $C_3$ is generated.

Explanation will be made now of the operation of the similarity calculation. This calculation is effected at the cycles of $(3N + 1)$, where $N$ is the number of words making up the unknown and standard patterns which is designated by an instruction. It is here assumed that prior to the calculation the unknown pattern is contained in a succession of N words, while the first and second standard patterns are contained in a separate succession of 2N words in such a sequence that the first word of the first standard pattern is contained in the first word stored in the memory unit 11 and the first word of the second standard pattern is included in the second word stored in the memory unit 11. In like manner, it is assumed that the words of the first and second standard patterns are contained alternately in the memory unit 11.

It is also assumed that the initial address of the memory unit 11 where the unknown pattern is contained is set in the register 8, while on the other hand the initial address of the memory unit 11 in which the standard patterns are contained in set in the register 9. The correlation constant with respect to the first standard pattern is set in the register 18, while the correlation constant with respect to the second standard pattern is set in the register 21. Further, the registers 17 and 20 are assumed to be cleared. In addition, it is assumed that control flip-flops 35, 36, 38 and 39 of FIG. 4c are reset but the flip-flop 37 is not reset.

The first word of the unknown pattern is read out in cycle 1. As a result, the content of the register 8 storing the initial address of the unknown pattern as shown in FIG. 3 is set in the memory address register 10 through the output bus 6. This is followed by the reading of the memory, and the read data is set in the data register 12. On the other hand, the data applied to the arithmetic unit 7 from the output bus 6 is increased by one in the arithmetic unit 7 and again set in the register 8 through the input bus 5. The content of the register 8 thus makes up the address of the second word of the unknown pattern.

It is assumed that the above-mentioned operation is performed prior to the generation of timing pulse $C_3$ of cycle 1 and that the set signal $A_O$ for the control flip-flop 35 is generated after the generation of the timing signal $C_O$ of cycle 1. The set signal $A_O$ causes the flip-flop 35 to be set thereby to produce as an output the control signal R in the state of 1, indicating that the calculation of the similarity is under way. As a result of generation of the set signal $A_O$, the constant designated by the program that is the number N of words is set in the counter 40. Further, the registers 17 and 20 are cleared by the signal $A_O$ to be changed into the 0 state. In this case, the number N of words is assumed to be two. The timing pulse $C_3$ is delivered at the last stage of cycle 1 whereby the data stored in the flip-flops 12*a* to 12*d* are set in the flip-flops 13*a* to 13*d*.

In cycle 2, the generation of timing pulse $C_O$ first causes the flip-flop 36 to be set. Since clock pulses are applied to the flip-flops 37, 38 and 39, the flip-flop 38 is set while the flip-flop 37 is reset. As a result, the control signal $R_O$ is put into the state of 0, while the control signal $R_1$ becomes a 1 signal. The flip-flop 38 indicates the reading of the first standard pattern. In the process, the initial address of the standard pattern stored in the register 9 is set in the memory register 10 through the output bus 6. Then the reading operation is performed and the read data is set in the data register 12. The data applied to the arithmetic unit 7 from the output bus 6, on the other hand, is increased by one and again set in the register 9, so that the data in the register 9 becomes the address of the first word of the second standard pattern.

The above-mentioned operation is performed prior to the generation of the timing pulse $C_3$ for cycle 2, and the generation of the timing pulse $C_3$ causes the data in the flip-flops 12*a* to 12*d* to be set in the flip-flops 14*a* to 14*d*.

In cycle 3, the generation of timing pulse $C_O$ causes clock pulses to be applied to the flip-flops 37, 38 and 39 and as a result the flip-flop 38 is reset, while the flip-flop is set. The control signal $R_1$ which is a 1 signal of the flip-flops is changed to a 0 signal, while the control signal $R_2$ becomes a 1 signal. In this way, it is indicated that the cycle is under way for reading the second standard pattern and calculating the similarity between unknown pattern and the first standard pattern. In other words, as in cycle 2, the data on the address stored in the register 9 is read out by the register 12, while 1 is added to the register 9 thereby to update it. Thus the data in the register 9 becomes the address of the second word of the first standard pattern.

When the flip-flops 13*d* and 14*d* are both in the state of 1 due to the first timing pulse $C_1$, pulses are produced at the output terminal $A_1$ of the AND circuit 15*a* and one correlation constant is added to the register 17 for containing the similarity. In other words, the outputs 19*a* and 19*b* of the adder 19 are set in the flip-flops 17*a* and 17*b* respectively. These outputs are a sum of the correlation constant stored in the flip-flops 18*a* and 18*b* and the data stored in the flop-flops 17*a* and 17*b*.

The generation of the the first timing pulse $C_2$ causes the registers 13 and 14 to be shifted by one bit. The flip-flops 13*a*, 13*b*, 13*c* and 13*d* receive the data stored in the flip-flops 13*d*, 13*a*, 13*b* and 13*c* respectively prior to the generation of timing pulse $C_3$. In like manner, flip-flops 14*b*, 14*c*, and 14*d* receive the data stored in the flip-flops 14*a*, 14*b* and 14*c* prior to the generation of the timing pulse $C_3$ respectively.

When the flip-flops 13*d* and 14*d* are both in the state of 1, the second timing pulse $C_1$ causes a pulse to be produced at the output terminal $A_1$, whereby one correlation constant is added to the register 17. Similar operations are repeated thereby to calculate the analogy between the first word of the unknown pattern and the first word of the first standard pattern in cycle 3. At the last stage of cycle 3, the timing pulse $C_3$ is delivered whereupon the data on the first word of the second standard pattern read out by the flop-flops 12*a* to 12*d* is set in the flip-flops 14*a* to 14*d*. The generation of timing pulse $C_3$ causes a clock pulse to be applied to the counter 40 whereby it is counted down from 2 to 1.

In cycle 4, the timing pulse $C_O$ first causes the flip-flop 37 to be set and the flip-flop 39 to be reset. This is followed by the processes in which as in cycle 1 the second word of the unknown pattern is read out by the register 12 and the data in the register 8 is updated by being increased by one. Also, due to the timing pulses $C_1$ and $C_2$ the correlation constant stored in the register 21 is added to the register 20 as in the operation explained with reference to cycle 3. The number of times of the addition of correlation constant is the same as the number of times the flip-flops 13*a* to 13*d* and corresponding ones of the flip-flops 14*a* to 14*d* are both in the state of 1. In other words, to the register 20 are added the correlation constant by the number of times the first words of the unknown pattern and the second standard pattern correlate to each other. At the last stage of cycle 4, the timing pulse $C_3$ causes the data on the second word of the unknown pattern read out by the flip-flops 12*a* to 12*d* to be set in the flip-flops 13*a* to 13*d*.

In cycle 5, the timing pulse $C_O$ causes the flip-flop 37 to be reset and the flip-flop 38 to be set. As a result, the second word of the first standard pattern is read out by the data register 12 as in cycle 2 and then set in the register 14 by the timing pulse $C_3$. The data in the register 9 is increased by one thereby to indicate the address of the second word of the second standard pattern.

The operation in cycle 6 is identical with that in cycle 3. In other words, flip-flop 38 is reset and the flip-flop 39 is set. The second word of the second standard pattern is read out and set in the data register 12. Further, the correlation is sought for each bit between the data on the second word of the unknown pattern set in the register 13 and the data on the second word of the first standard pattern set in the register 14, and the correlation constant of the register 18 is added to the register 17 by the number of times the correlation has been detected.

The data read out by the register 12 through the timing pulse $C_3$ is set is the register 14. The timing pulse $C_3$ causes a clock signal to be applied to the counter 40 so that it is counted down from 1 to O, with the result that the output of the AND circuit 41 changes to a 1 signal thereby to indicate that it is ready for completion of the calculation of the similarity.

In cycle 7, the timing pulse $C_O$ causes the flip-flop 39 to be reset and the flip-flop 37 to be set. As in cycle 4, the correlation for each bit is sought between the data on the second word of the unknown pattern set in the register 13 and the data on the second word of the second standard pattern set in the register 14, and the correlation constant stored in the register 21 is added to the register 17 by the number of times the correlation has been detected. The timing pulse $C_3$ in this cycle causes the flip-flops 35 and 36 to be reset thereby to complete the execution of the instructions on the calculation of the similarity.

According to the instructions on the calculation of the similarity, the registers 17 and 20 conduct the calculation of the similarity between the unknown pattern and the first standard pattern and between the unknown pattern and the second standard pattern respectively.

Although the above explanation is concerned with the case in which an unknown pattern or a standard pattern includes two words, it is apparent that the invention is applicable to the cases in which N words are included in an unknown pattern or standard pattern by setting the number N in the counter 40 to perform the operation of similarity calculation.

Also, the above explanation assumed that the number M of standard patterns is 2, but it is not limited to the case of two standard patterns. Instead, it is applied to the similarity calculation involving a given number of standard patterns as explained below.

In such a case, the logical circuit of FIGS. 3 and 4*b* may comprise M detectors instead of two detectors 15 and 16 for detecting the correlation between an unknown pattern and a standard pattern, M adders and registers instead of two adders 19 and 22 and two registers 18 and 21 for setting the correlation constands, and M registers instead of two registers 17 and 20 for writing the similarity. Further, M + 1 flip-flops instead of the three flip-flops 37, 38 and 39 are provided to constitute a ring counter producing the outputs $R_o$, $R_l$, . . . $R_M$ respectively. In this way, it is possible to effect the calculation of the similarity to M standard patterns by means of a single instruction.

In such a case, the time required for calculation is expressed as $$(M + 1)N + 1 \text{ cycle}$$

Therefore, the average time required for the calculation of the similarity to one standard pattern is $$(M + 1)N + 1/M = N + N + 1/M$$

From this equation it will be seen that with the increase in the number M of standard patterns, the average time required for calculation of the similarity to a standard pattern is reduced for improved processing speed.

As is apparent from the above description, the use of the digital information processing apparatus according to the invention in the recognition logical section of an optical character reader permits the realization of a reader with a practical reading speed. Also, according to the invention, the types of styles of letters to be read can be changed at will by rewriting the data on the standard patterns in the memory unit. Furthermore, the number of types or styles of characters to be read is increased by adding memory units as required without rearranging the logical circuit.

It will be understood from the above detailed explanation that the digital information processing apparatus according to the invention is provided with the registers 13 and 14, the correlation detectors 15 and 16, the adder 19 and the control circuits therefor specializing in the calculation of the similarity, so that the similarity of an unknown pattern to M standard patterns can be calculated at quite a high speed. In addition the invention is used for recognition of not only characters but other patterns by replacing the program and data.

We claim:

1. A digital information processing apparatus for pattern recognition comprising: a memory unit for storing a piece of information representing an unknown pattern and M pieces of information representing M standard patterns (M being a given integral number) in a predetermined sequence of addresses word by word, each piece of information including N words (N being a given integral number); memory address register means for designating in said predetermined sequence the N (M + 1) addresses of said memory unit at which said M+1 pieces of information are stored so that each piece of information of said unknown pattern and said M standard patterns is read out of said memory unit word by word in said predetermined sequence; data register means for temporarily storing each piece of information read out of said memory unit word by word; first register means for storing only said information of said unknown pattern selectively transferred from said data register means; second register means for storing only said plurality of pieces of information of said standard patterns selectively and sequentially transferred from said data register means; M correlation constant registers each storing a predetermined correlation constant corresponding to each of said M standard patterns; M correlation detectors each comparing said information of said unknown pattern stored in said first register means with said information of one of said standard patterns stored in said second register means by means of each bit and detecting the number of times of agreement between said unknown pattern and said standard pattern; and M adders provided for the respective one of said M standard patterns each for adding said correlation constant stored in a corresponding one of said correlation contant registers by the number of times of the agreement between said unknown pattern and said standard pattern in response to an output from said correlation detector, whereby the similarity between said unknown pattern and each of said M standard patterns is determined on the basis of the content of each of said adders.

2. A digital information processing apparatus according to claim 1, in which said information of said unknown pattern is stored so that the first to the N-th words are sequentially stored, and said information of said standard patterns is stored in series so that the words of the corresponding orders in the respective information are sequentially stored.

3. A digital information processing apparatus according to claim 2, further comprising control means for reading from said memory unit and transferring to said data register a word of information on each of said unknown pattern and said standard patterns in one cycle.

4. A digital information processing apparatus according to claim 3, further comprising control means for detecting through said correlation detector the agreement for each bit between the L-th word (L being smaller than N) of the information of said unknown pattern and the L-th word of the H-th standard pattern (H being smaller than M) and storing the information of the L-th word of the (H + 1)th standard pattern in said second register means, in one cycle.

5. A digital information processing apparatus according to claim 3, in which said control means comprises a shift register including M + 1 flip-flops, one of said flip-flops being set in the state of 1, the others of said flip-flops being set in the state of 0, means for applying one shift pulse to said shift register in one cycle, gate means for controlling the application of the data from said data register means to said first register means in response to the output from one of said flip-flops of said shift register, and another gate means for controlling the application of the data from said data register means to said second register means in response to the output from the other flip-flops of said shift register.

6. A digital information processing apparatus according to claim 2, further comprising a control means including: a down counter the content of which is initially set at N and reduced by one each time a word of the information of said unknown pattern or said M standard patterns is read out of said memory unit, a flip-flop which is reset in response to a signal produced from said down counter when the content of said counter is reduced to zero, and means for stopping the operation of the correlation detector in response to an output from said flip-flop, said correlation detector comparing the information stored in said first register means and that stored in said second register means.

* * * * *